US 6,718,426 B2

(12) United States Patent
Naya et al.

(10) Patent No.: US 6,718,426 B2
(45) Date of Patent: Apr. 6, 2004

(54) CACHE MEMORY APPARATUS AND CENTRAL PROCESSOR, HAND-HELD DEVICE AND ARITHMETIC PROCESSOR USING THE SAME

(75) Inventors: Hidemitsu Naya, Hitachi (JP); Hideyuki Okamoto, Johoku (JP); Koji Kawaki, Hitachinaka (JP); Yuji Sugaya, Hitachinaka (JP); Yuichiro Morita, Hitachi (JP); Yoshitaka Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 09/791,855

(22) Filed: Feb. 26, 2001

(65) Prior Publication Data

US 2002/0013877 A1 Jan. 31, 2002

(30) Foreign Application Priority Data

Jul. 19, 2000 (JP) ........................... 2000-219685

(51) Int. Cl.[7] .............................................. G06F 12/00
(52) U.S. Cl. ........................ 711/3; 711/123; 711/125; 711/221
(58) Field of Search .................... 711/3, 5, 123, 711/163, 201, 221

(56) References Cited

U.S. PATENT DOCUMENTS 5,375,216 A * 12/1994 Moyer et al.
5,721,874 A * 2/1998 Carnevale et al.

FOREIGN PATENT DOCUMENTS

| JP | A-62-231340 | * 10/1987 |
| JP | A-3-223931 | * 10/1991 |
| JP | A-5-324317 | * 7/1993 |
| JP | A-6-110681 | * 4/1994 |
| JP | A-6-242951 | * 9/1994 |
| JP | A-8-16390 | * 1/1996 |

OTHER PUBLICATIONS

"Construction/Design of Computer interface between hardware and Software" Patterson and Henecy (ISBN 4–8222–8057–8), pp. 498–576.*

* cited by examiner

*Primary Examiner*—Jack A. Lane
(74) *Attorney, Agent, or Firm*—Antonelli, Terry, Stout & Kraus, LLP

(57) ABSTRACT

A cache memory apparatus is provided with a cache memory for storing thereinto at least one of information about an instruction group related to a system control and information about a data group, an address managment table for managing both an address and a range with respect to the cache memory into which the information is stored, and a selection circuit for selecting the cache memory in response to an access to the address management table. As a result, information related to a system control is stored into the cache memory apparatus.

3 Claims, 17 Drawing Sheets

FIG.5A
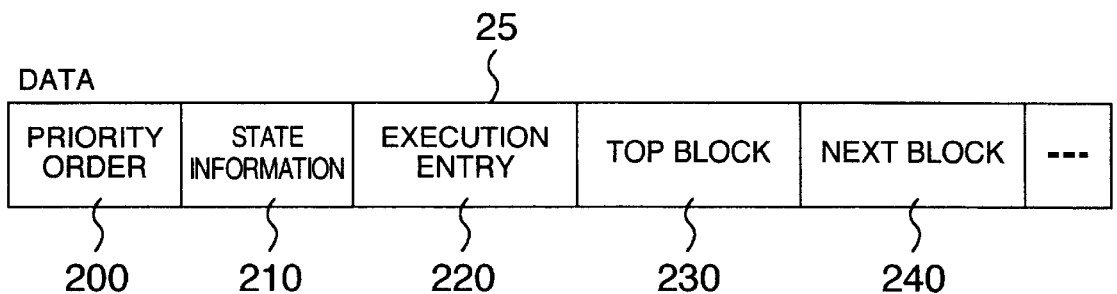
FIG.5B
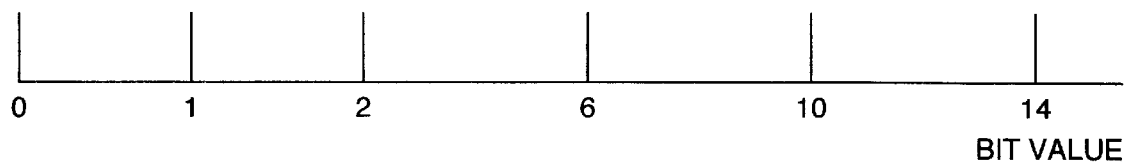
FIG.5C
| OFFSET MANAGEMENT TABLE | 50 |
|---|---|
| 300 ~ PRIORITY ORDER OFFSET | 0 ~ 310 |
| 320 ~ STATE INFORMATION OFFSET | 1 ~ 330 |
| 340 ~ EXECUTION ENTRY OFFSET | 2 ~ 350 |
| 360 ~ TOP BLOCK OFFSET | 6 ~ 370 |
| 380 ~ NEXT BLOCK OFFSET | 10 ~ 390 |
| ----- | ----- |

FIG.15

LDADRTBL ~ 900

PRFETCHR ~ 910

CLRCACHR ~ 920

EXCCACHR ~ 930

CLRCACHE ~ 940

CACHE MEMORY APPARATUS AND CENTRAL PROCESSOR, HAND-HELD DEVICE AND ARITHMETIC PROCESSOR USING THE SAME

BACKGROUND OF THE INVENTION

1. Field of the Invention

The present invention generally relates to a cache memory apparatus, and a data processing apparatus containing a control processing unit using this cache memory apparatus. More specifically, the present invention is directed to a data processing apparatus containing a cache memory apparatus for storing system control information.

2. Description of the Related Art

A conventional data processing apparatus such as a microprocessor employs architecture having a single cache memory which stores thereinto both instruction information and data information. Since the conventional data processing apparatus employs such a single cache memory, the storage content of this cache memory is frequently updated due to an instruction access sequence of an application program executed by this conventional data processing apparatus and also due to a capacity of data processed by this data processing apparatus. As a result, a cache hit rate of this single cache memory is low, and a frequency degree where this data processing apparatus accesses an external storage apparatus operated in slow speeds is increased, so that performance of the entire system would be lowered.

Very recently, on the other hand, most of data processing apparatus such as microprocessors own both cache memories for storing instructions and cache memories for storing data in a separate form in order to improve cache hit rates thereof. Also, with cache memories formed in a hierarchical manner, cache hit rates may be increased in certain data processing apparatus.

The related technical ideas have been described in, for example, JP-A-6-242951, JP-A-8-16390, and U.S. Pat. No. 5,375,216. In this related art, a single cache memory apparatus is subdivided into two cache memories which are employed so as to store instructions and data respectively.

Also, as described in JP-A-5-324317, the memory sequential look-ahead apparatus is provided so as to operate the cache memory apparatus in high speeds. Further, as described in JP-A-6-110681, the information transfer paths are separately provided for the instruction-storing cache memory apparatus and the data-storing cache memory apparatus.

In addition, the publication entitled "CONSTRUCTION/DESIGN OF COMPUTER, INTERFACE BETWEEN HARDWARE AND SOFTWARE" written by Patterson and Henecy (ISBN 4-8222-8057-8), pages 498 to 576, describes several mapping systems capable of achieving highspeed cache retrieving operations.

Also, although JP-A-3-223931 is not directed to a cache memory apparatus, this patent application describes that in the CPU system, the normal instructions and the sequential instructions are separately executed. Also, JP-A-62-231340 discloses the pipeline mounting method featured by that the process operations are subdivided every address of instruction data which is pre-loaded.

To increase the hit rates of the cache memories, the above-described conventional cache memory apparatus is subdivided into two cache memories for storing the instructions and the data. However, since this conventional cache memory apparatus does not consider the instruction access sequence of the application program but also the change in the cache memory contents caused by the capacity of the data operated by this application program, the cache hit rate for the instruction group which manages the execution of this application program and also the cache hit rate for the data group would be lowered. As a result, performance of the entire system would be deteriorated.

As one example of both the instruction group and the data group, which may manage the execution of the above-explained application program, there is provided system control information which may give adverse influences such system performance. As one example of this system control information, there are both an instruction group and a data group, which are related to an operating system constituting a base of this application program.

In JP-A-5-324317, both the instruction group and the data group used in this operating system, for example, TCB (task control block) are handled similar to both the instruction group and the data group used in the application program. As a result, when the content of the cache memory is changed due to the execution condition of this application program, both the instruction group and the data group of the operating system are adversely influenced. In the worst case, these instruction group and data group of the operating system are deleted from the cache memory, the cache hit rate is varied. Therefore, it is practically difficult to predict the behavior of the entire system.

As a consequence, in an assembled control system which requires strict timing controls, while a real-time operating system is employed as the above-explained operating system, there are many possibilities that both the instruction group and the data group of this real-time operating system are utilized outside a cache memory. Since the real-time operating system is utilized outside the cache memory, the external memory must be accessed. Since the access speed of this external memory is very slower than that of the cache memory, performance of the entire system would be deteriorated.

SUMMARY OF THE INVENTION

A first object of the present invention is to provide such a memory apparatus capable of increasing performance of an entire system, while system control data is cached without being adversely influenced by behavior of an application program.

A second object of the present invention is to realize a high-speed access operation to system control information and also to improve a cache hit rate in a cache memory apparatus.

Also, a third object of the present invention is to improve an access characteristic of a cache control operation in a central processing apparatus having an instruction group to operate a system control information group.

The above-explained first object of the present invention may be achieved by that in a cache memory apparatus for storing thereinto either a portion or all of information stored in a memory, the cache memory apparatus is comprised of: a cache memory for storing thereinto at least one of information about an instruction group related to a system control and information about a data group; an address management table for managing both an address and a range with respect to the cache memory into which the information is stored; and a selection circuit for selecting the cache memory in response to an access to the address management table. In other words, in order to achieve the above-explained first object, the present invention is featured by employing a cache memory apparatus for storing thereinto both information of an instruction group and information of a data group, which are related to a system control. Also, in order to select this cache memory apparatus, an address management table is provided so as to manage an address and a range on a memory where the above-explained information is stored. Then, the selection circuit for selecting the cache memory apparatus based on this address management table is employed. As a result, the registration of the above-explained system control information into the cache memory apparatus is no longer required. There is such an effect that the highspeed access operation to this system control information can be realized, and also the cache hit rate can be improved.

The second object of the present invention may be achieved by employing an offset management table and an instruction control apparatus in the above-explained cache memory apparatus. The offset management table manages an offset value in which an item for constituting the system control information is stored. The instruction control apparatus decodes an instruction used to operate this offset value. In other words, in order to achieve the second object, the present invention may be accomplished by employing an offset management table and an instruction control apparatus so as to effectively access the information of the instruction group and the information of the data group related to the system control. The offset management table manages an offset value which constitutes a storage position with respect to each of items which constitute the above-explained information of both the instruction group and the data group. The instruction control apparatus decodes an instruction used to operate this offset value. As a consequence, the high-speed access operation to the system control information can be realized, and also the cache hit rate can be increased in the cache memory apparatus.

The third object of the present invention may be achieved by that in a central processing apparatus equipped with the above-explained cache memory apparatus, this central processing apparatus is comprised of means for designating an entry of the offset management table so as to interpret information which is located at an offset value of the entry, and for outputting an execution address, and then the execution address is set to a program counter. As a result, the access characteristic of the cache control performed in the central processing apparatus can be improved.

BRIEF DESCRIPTION OF THE DRAWINGS

A more better understanding of the present invention may be made by reading a detailed description in conjunction with the accompanying drawings, in which:

FIG. 5A, FIG. 5B and FIG. 5C are structural diagrams of an offset management table;

FIG. 15 is a structural diagram for illustratively showing a cache control/command set according to an embodiment of the present invention;

DETAILED DESCRIPTION OF THE EMBODIMENTS

Referring now to drawings, various embodiments of the present invention will be described in detail.

Figure 1:
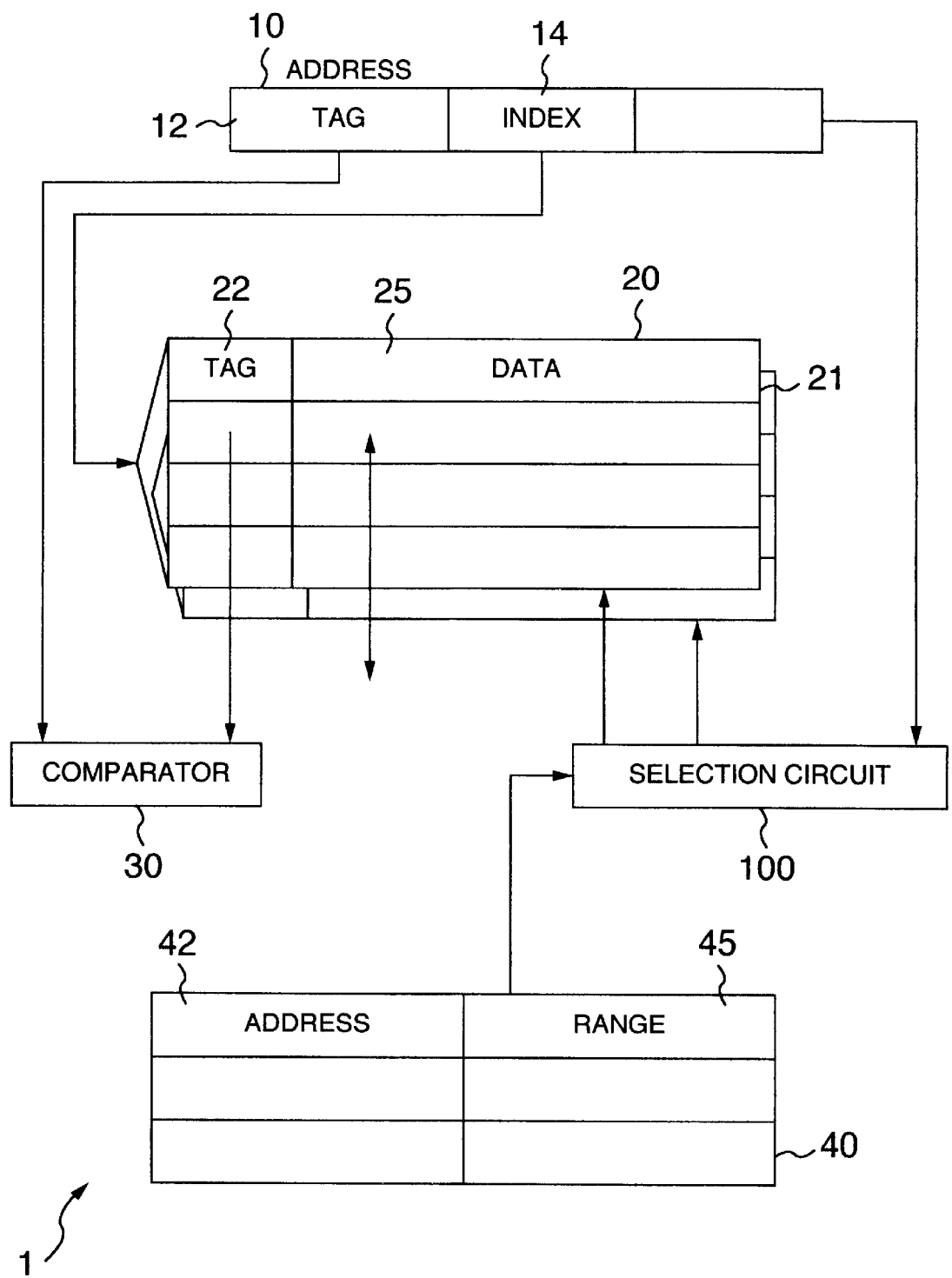
FIG. 1 is a basic structural diagram of a cache memory apparatus according to an embodiment of the present invention.

FIG. 1 is a schematic block diagram for showing an entire arrangement of a cache memory apparatus according to an embodiment of the present invention. In FIG. 1, reference numeral 1 indicates a cache memory apparatus. This cache memory apparatus 1 is provided with an address 10, a cache memory 20, a comparator 30, an address management table 40, and a selection circuit 100. The cache memory 20 may be realized by, for instance, an SRAM, and a RAM built in a CPU.

In this embodiment of this drawing, such a cache memory which may be combined with a CPU and a CPU core will now be described. Alternatively, instead of the cache memory, the cache memory apparatus may be contained as a buffer memory, or an ASIC. Also, other memories such as a buffer memory will be explained as a cache memory.

An address 10 of the cache memory apparatus 1 corresponds to a bit stream made of, at least, a tag bit group 12 and an index bit group 14. The cache memory 20 corresponds to such a memory apparatus having a plurality of cache blocks 21. The cache block 21 stores both tag information 22 and data 25. The comparator 30 corresponds to an apparatus for comparing the tag bit group 12 with tag information 22 of a selected cache block. The address management table 40 corresponds to such a table used to manage addresses 42 and a range 45 thereof. At the addresses 42, both an instruction group related to system control information and a data group are stored in the address management table 40. The selection circuit 100 corresponds to such a circuit for comparing the address 10 and the address 42 of the address management table 40 with the range 45 so as to select the cache memory 20.

Figure 2:
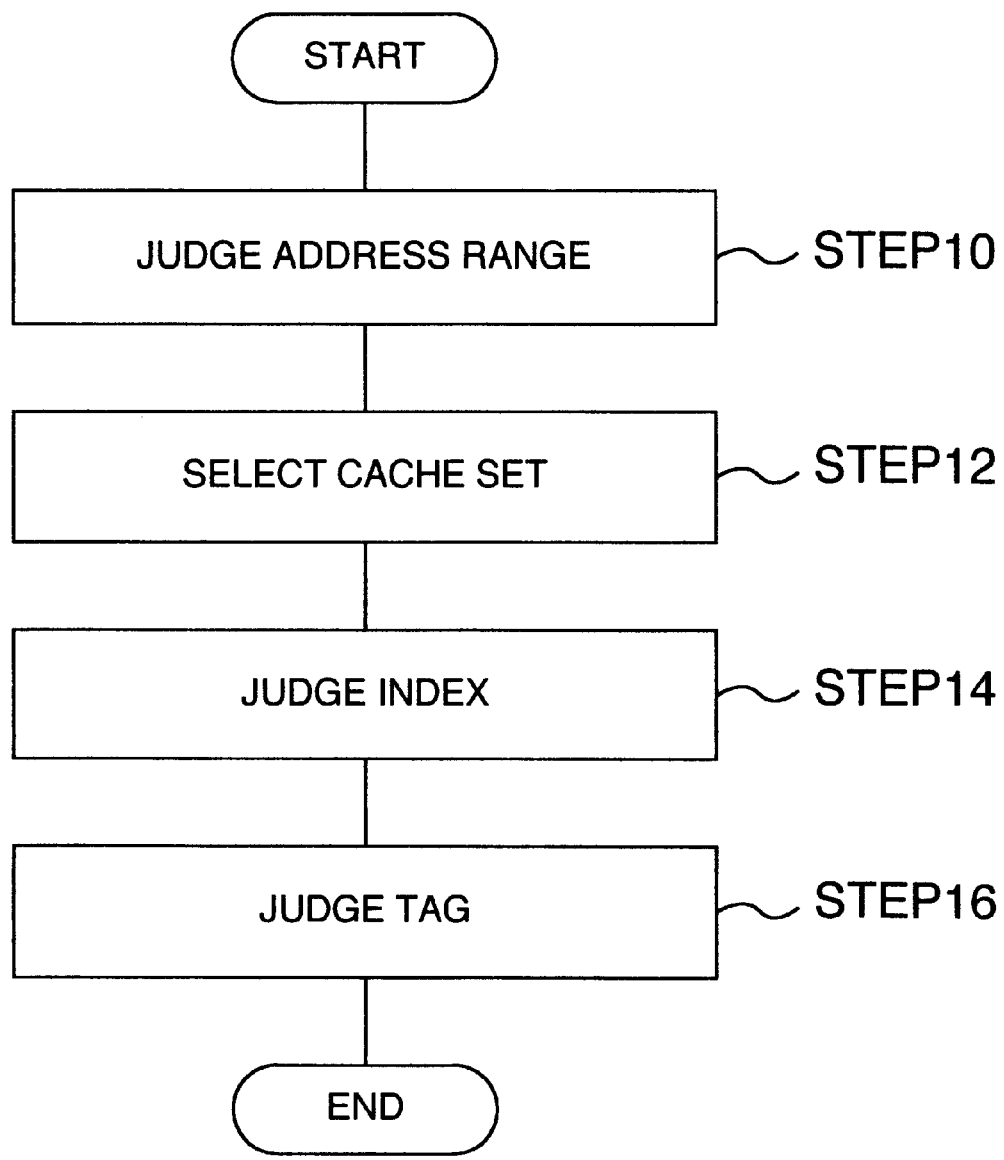
FIG. 2 is a flow chart for describing a read operation executed in the cache memory apparatus of FIG. 1.

Next, a sequential operation for reading the address 10 in correspondence with the cache memory 20 in the cache memory apparatus according to the embodiment of the present invention will now be described with reference to FIG. 2.

The address 10 is subdivided into both the tag bit group 12 of the upper grade portion of this address and the index bit group 14 of the lower grade portion thereof. The selection circuit 100 performs the comparison among the address 42, the range 45, the tag bit group 12, and the index bit group 14, which are stored in the table 40. The selection circuit 100 judges as to whether or not the data 25 of this cache block 21 is located within the address range stored in the table 40 (step 10).

Based upon the judgement result, a cache set is selected (step 12). Furthermore, the corresponding cache block 21 is selected based on the index bit group 14 of the address 10 (step 14). Then, the tag bit group 12 of the address 10 is compared with the tag information 22 of the selected cache block by the comparator 30 in order to judge as to whether or not the data 25 of this selected cache block 21 corresponds to the data of the requested address 10 (step 16).

In an alternative case, while the cache block 21 owns a valid bit, a decision may be made as to whether the data 25 is valid or invalid based upon true/false information of this valid bit in addition to the above-explained two judgement results. This valid bit indicates as to whether data of the cache block 21 is valid, or invalid.

In accordance with the cache memory apparatus of this embodiment, the following structural elements are provided in the independent manner, namely, the cache memory 20, the address 42 in which both the instruction group related to the system control information and the data group are stored, the table 40 for managing the range 45, and also the selection circuit 100. As a consequence, the below-mentioned effects can be achieved. That is, the cache memory apparatus can be selected in high speeds, the access speed to the system control information can be achieved in high speeds, and also the cache hit rate can be improved.

Next, a sequential operation for writing the address 10 in correspondence with the cache memory 20 in the cache memory apparatus according to the embodiment of the present invention will now be described with reference to FIG. 3.

Figure 3:
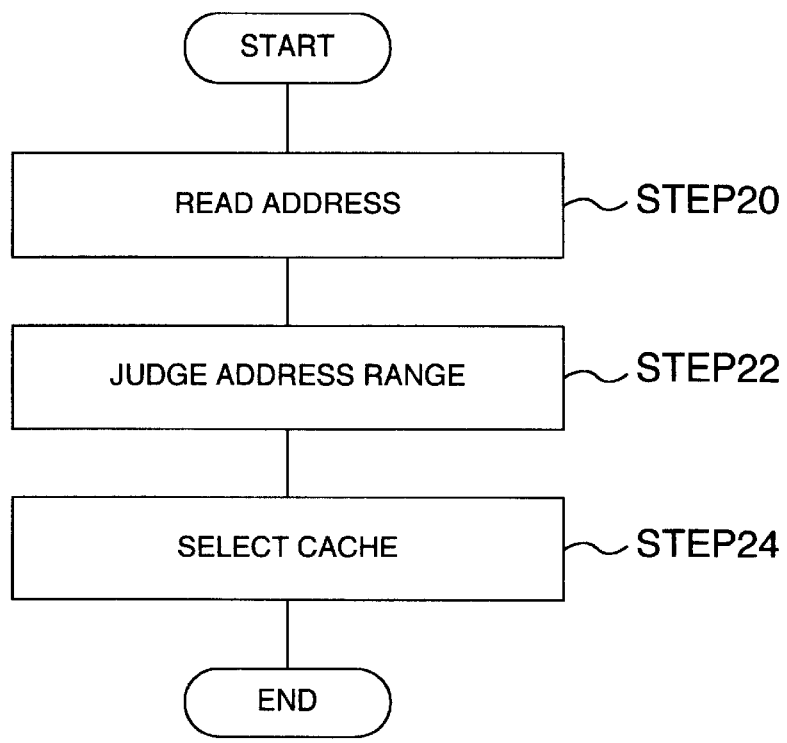
FIG. 3 is a flow chart for describing a write operation executed in the cache memory apparatus of FIG. 1.

In FIG. 3, the address 10 is read into the selection circuit 100 (step 20). Then this selection circuit 100 judges as to whether the address 10 is located inside an area defined by the address 42 and the range 45, or outsides this area with reference to the address management table 40 (step 22). The address 42 and the range 45 are managed by the address management table 40. Then, the selection circuit 100 selects the cache memory 20 (step 24).

In accordance with the cache memory apparatus of this embodiment, with the cache memory 20 and the table 40 for managing the address 42 and the range 45 provided. Both the instruction group related to the system control information and the data group are stored in correspondence with the address 42. There are such effects that the access speed to the system control information can be increased, and also the cache hit rate can be improved.

Figure 4:
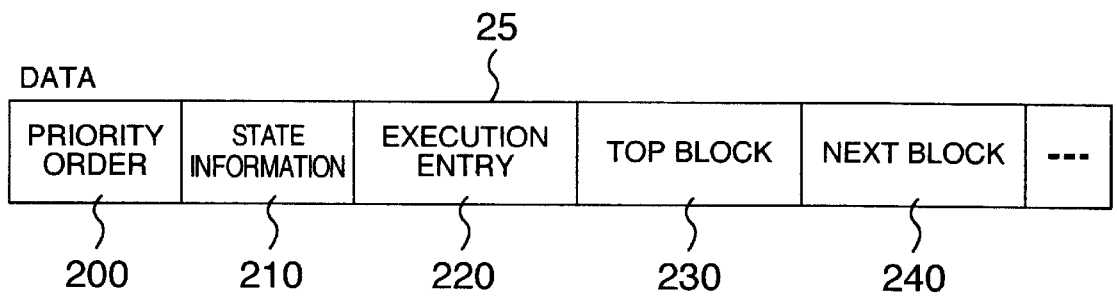
FIG. 4 is a diagram for illustratively indicating system control information of an embodiment used on the cache block of FIG. 1.

Referring now to FIG. 4, a description will be made of an example of system control information on a cache block in the cache memory apparatus of the embodiment of the present invention, namely, a structural example of the data 25 of the cache block 21. FIG. 4 illustratively shows such a structural example that the above-explained system control information used to manage system operations such as a task, a process, and a thread is stored into the cache block 21 of the cache memory 20 (see FIG. 1). This system control information stores thereinto at least a priority order 200 of the system operation, state information 210 of the system operation, an execution entry 220 of the system operation, a top block 230 and a next block 240 which are employed so as to store relevant information of the system control information.

As previously explained, since the system control information is stored in the cache memory 20, the access speed to this system control information can be increased. It should be understood that, in this embodiment, as the system control information, the task control block for managing the task, the process and the thread has been described. Alternatively, various sorts of header information in which groups of the above-explained items as explained in this example are provided as the system control information may also be utilized as the system information in the cache memory apparatus of the present invention.

Next, there is shown in FIG. 5C, an example of an offset management table 50 in one embodiment of the present invention. As indicated in FIG. 5A, the offset management table 50 is employed so as to manage a priority order offset 300 and a value 310 of this priority order offset 300 corresponding to the priority order 200 of the system operation; a priority order offset 320 and a value 330 of this priority order offset 320 corresponding to the state information 210 of the system operation; an execution entry offset 340 and a value 350 of this execution entry offset 340 corresponding to the execution entry 220 of the system operation; a top block offset 360 and a value 370 of this top block offset 360 corresponding to the top block 230; and a next block offset 380 and a value 390 of this next block offset 380 corresponding to the next block 240, which are contained in the data 25 of the cache block 21 of the cache memory 40. Both the top block 230 and the next block 240 are employed so as to store the relevant information of the system control information. FIG. 5B indicates bit positions within the data 25.

As previously explained, since the offset management table 50 for managing the offset values is provided, the positional relationship among the data stored in the cache memory 40 can be made clear. As a result, the access positions into the data 25 can be freely set, so that the access performance may be improved.

Figure 6:
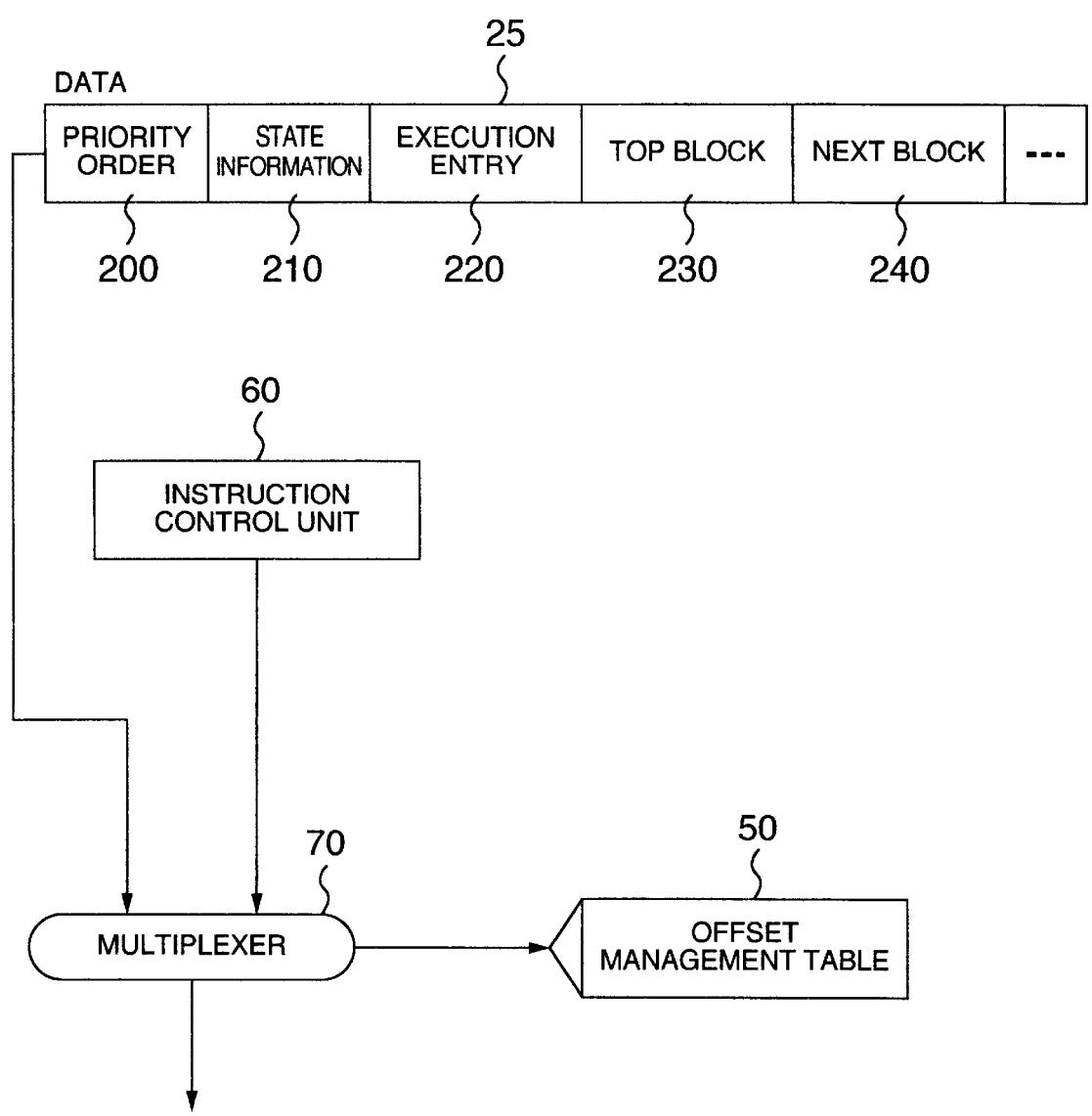
FIG. 6 is a structural diagram of a data access by an offset.

Next, FIG. 6 illustratively shows a structural example of a data access operation by way of an offset in the cache memory apparatus of the embodiment of the present invention. In FIG. 6, an instruction control unit 60 corresponds to such a unit which decodes an instruction set, and produces an index of the offset management table 50. The index corresponds to an item contained in the data 25 related to this instruction. A multiplexer 70 reads an offset value of this index from the offset management table 50 based upon the data 25 and the index outputted from the instruction control unit 60, and outputs a portion of this data 25 based upon the offset value of this index.

Since such a data access operation is carried out, the data can be accessed irrespective of the byte alignment, and thus, the highspeed data access operation can be carried out.

Figure 7:
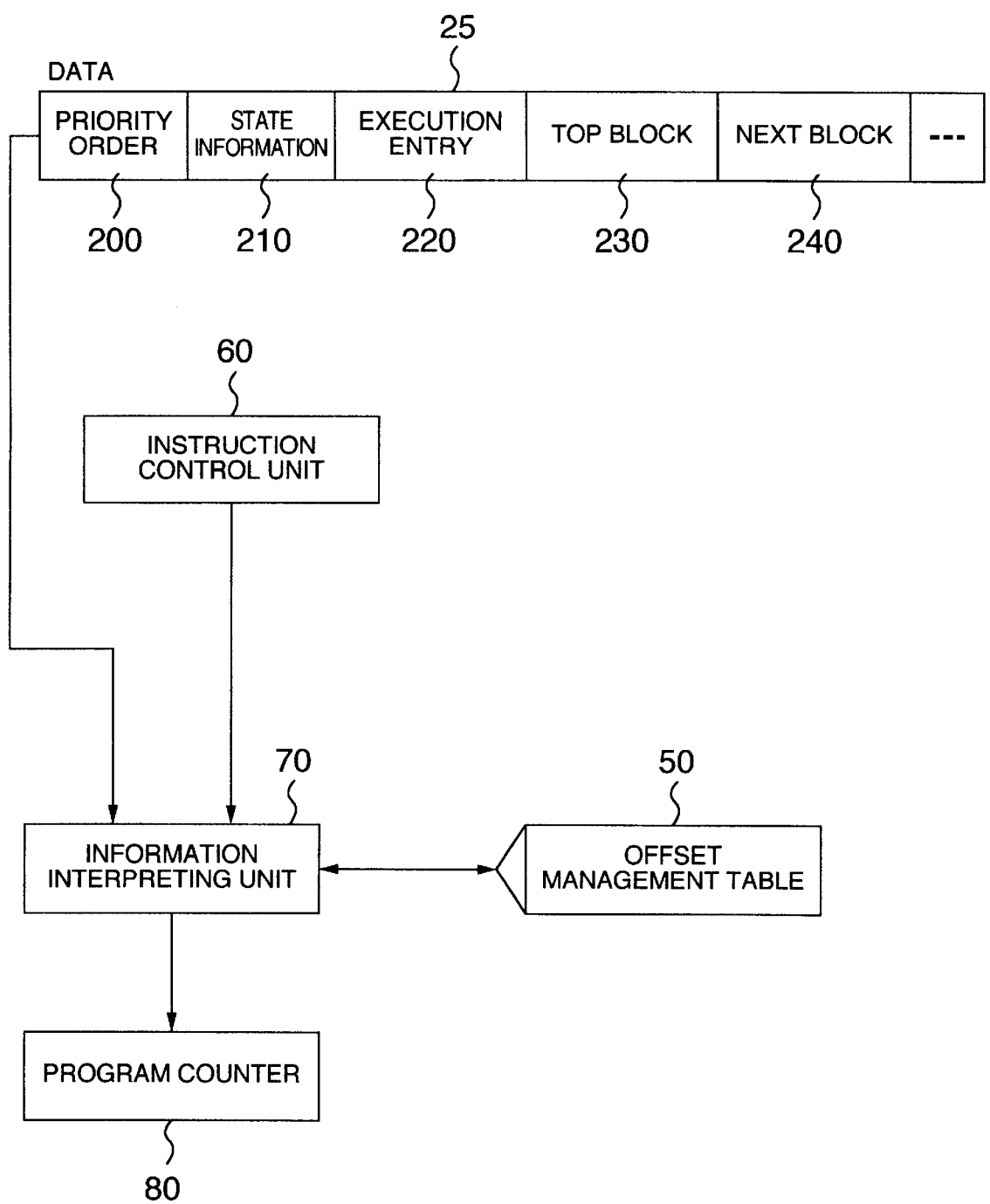
FIG. 7 is a structural diagram for illustratively showing an instruction executed from the cache memory apparatus.

Subsequently, FIG. 7 illustratively represents an example of a setting operation for a program counter which may execute an instruction from a cache memory in the embodiment of the present invention.

When an execution instruction set made based on the system control information is fetched into the instruction control unit 60, this instruction control unit 60 issues an entry number of the offset management table 50, corresponding to the above-described instruction set, to an information interpreting unit 70. This information interpreting unit 70 reads the execution entry 220 which is stored in the offset position corresponding to this entry number from the data 25, and then interprets as information of this execution entry 220. The information of the execution entry 220 may differ from each other, depending upon a sort of an operating system (OS). In a simple operating system, this execution entry 220 may constitute a physical address, whereas in a complex operating system, the information of the execution entry 220 may constitute an entry to information related to an execution file.

In the complex operating system, an execution unit of process operation as to a task and a process is managed as a file on a file system. As a result, in order to execute this file, this file is required to be expanded on a memory so as to be executed. An entry of an execution file may constitute information of a memory image of a file expanded on a memory. Both identification information functioning as an execution file and also header information used to set an execution set are given to a memory image, or attached. In this case, the information interpreting unit 70 interprets this header information to produce an execution environment, namely an execution address. When such an execution address is produced, the information interpret unit 70 conducts to be set to the program counter 80, and starts to execute a new process unit.

As previously explained, with both the offset management table 50 and the information interpreting unit 50 provided, the process operation can be initiated in a high speed.

Figure 8:
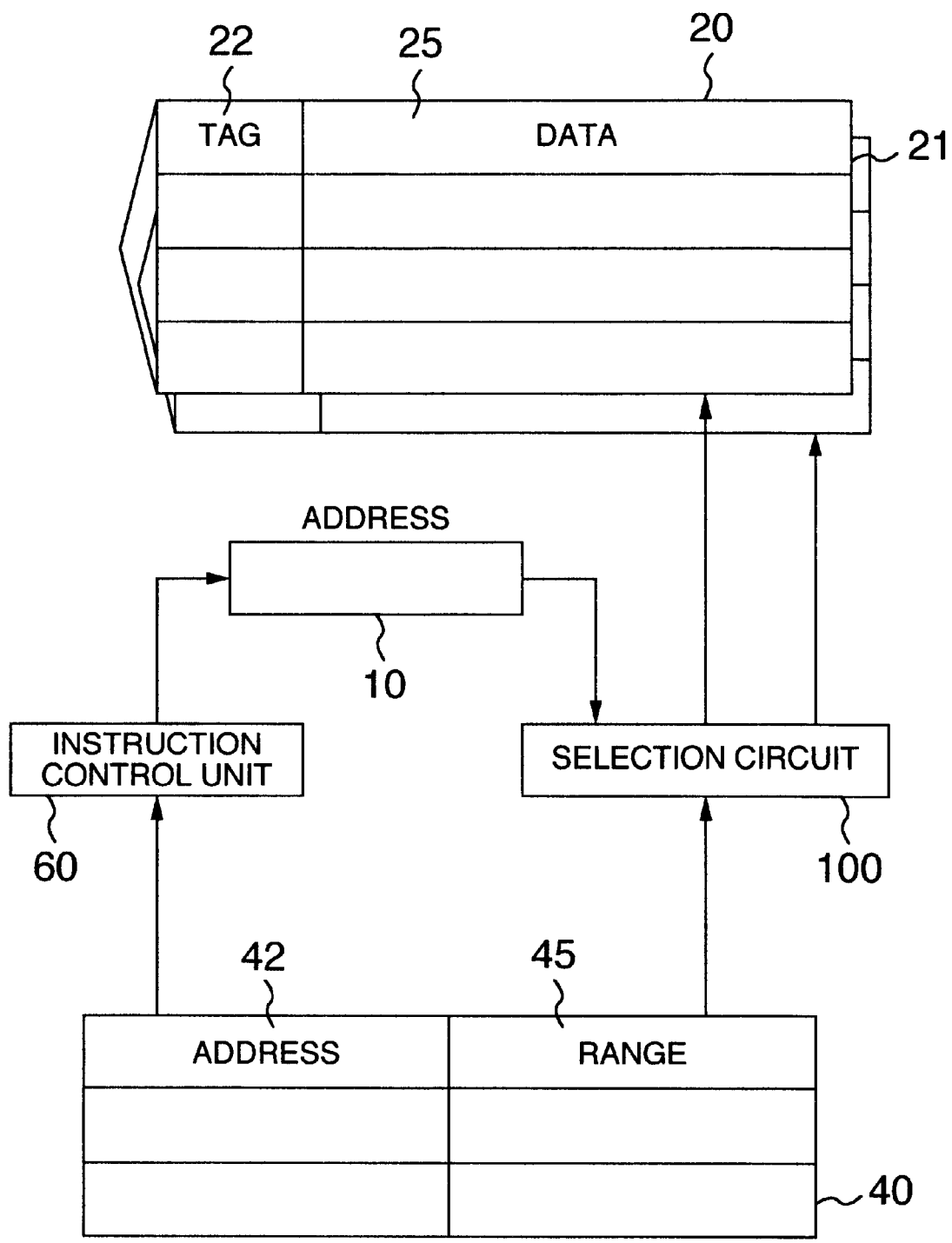
FIG. 8 is a structural diagram of a cache load.
Figure 9:
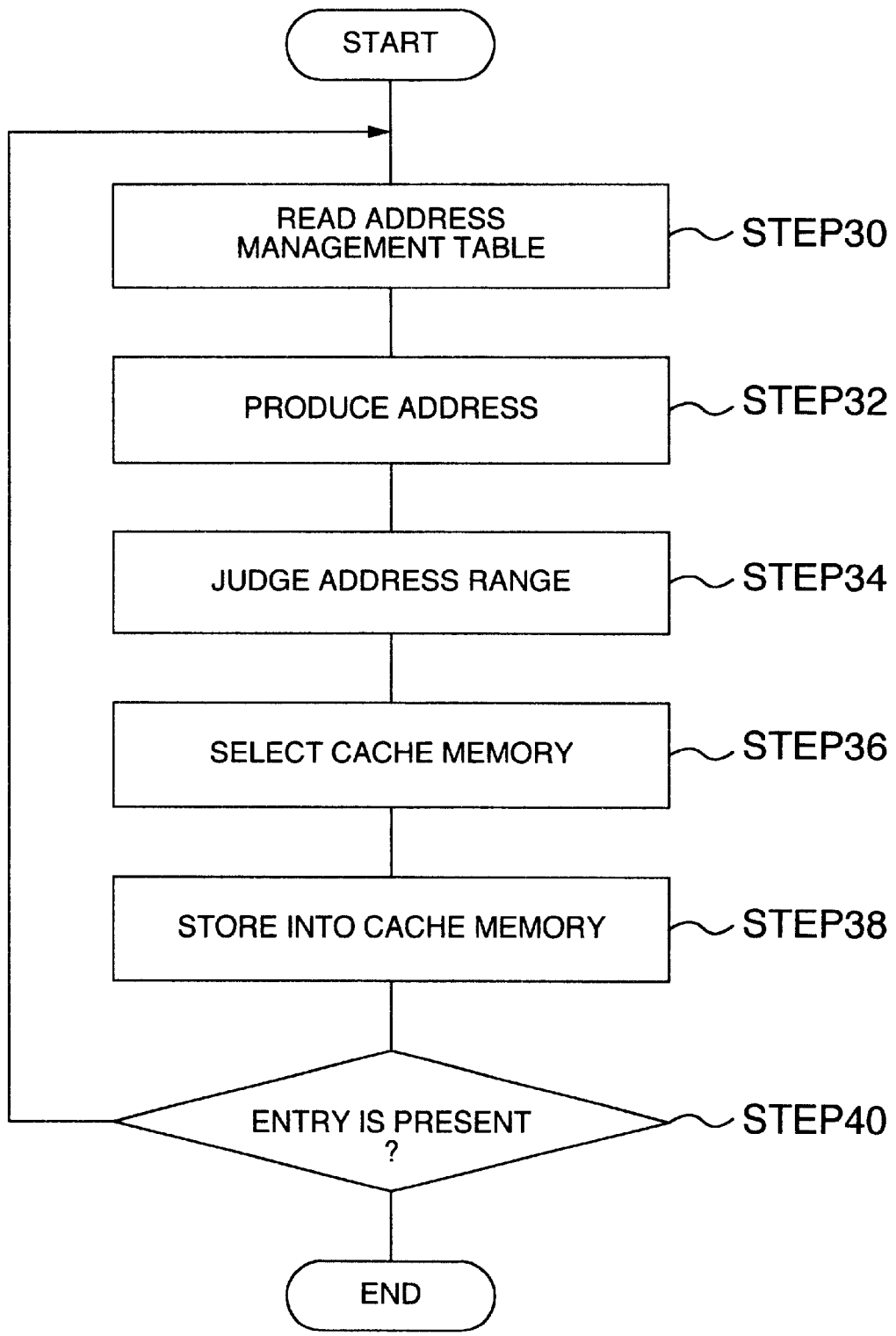
FIG. 9 is a flow chart for describing a cache load.

FIG. 8 illustratively shows an example in which a pre-load operation of the cache memory according to the embodiment of the present invention is carried out, and FIG. 9 indicates processing steps of this pre-load operation.

When a pre-load instruction of the cache memory 20 is fetched by the instruction control unit 60, the instruction control unit 60 refers to the address management table 40 (step 30), and then the instruction control unit 60 reads out both the address 42 and the range 45 from the entry of this address management table 40 so as to produce the address 10 (step 32). In the selection circuit 100, the produced address 10 is compared with both the address 42 and the range 45 of the entry of the address management table 40 (step 34), and then, the cache memory 20 is selected based upon the judgement result (step 36). The data defined from the address 42 to the range 45 are stored in the cache memory 20 which is selected based upon the judgement result (step 38). This operation is continued until the instruction control unit 50 reads out all of the entries of the address management table 40 (step 40).

As previously explained, since the data stored in an arbitrary address area can be stored into the cache memory 20 based upon the memory management table 40, the cache misbit of this data can be avoided.

Figure 10:
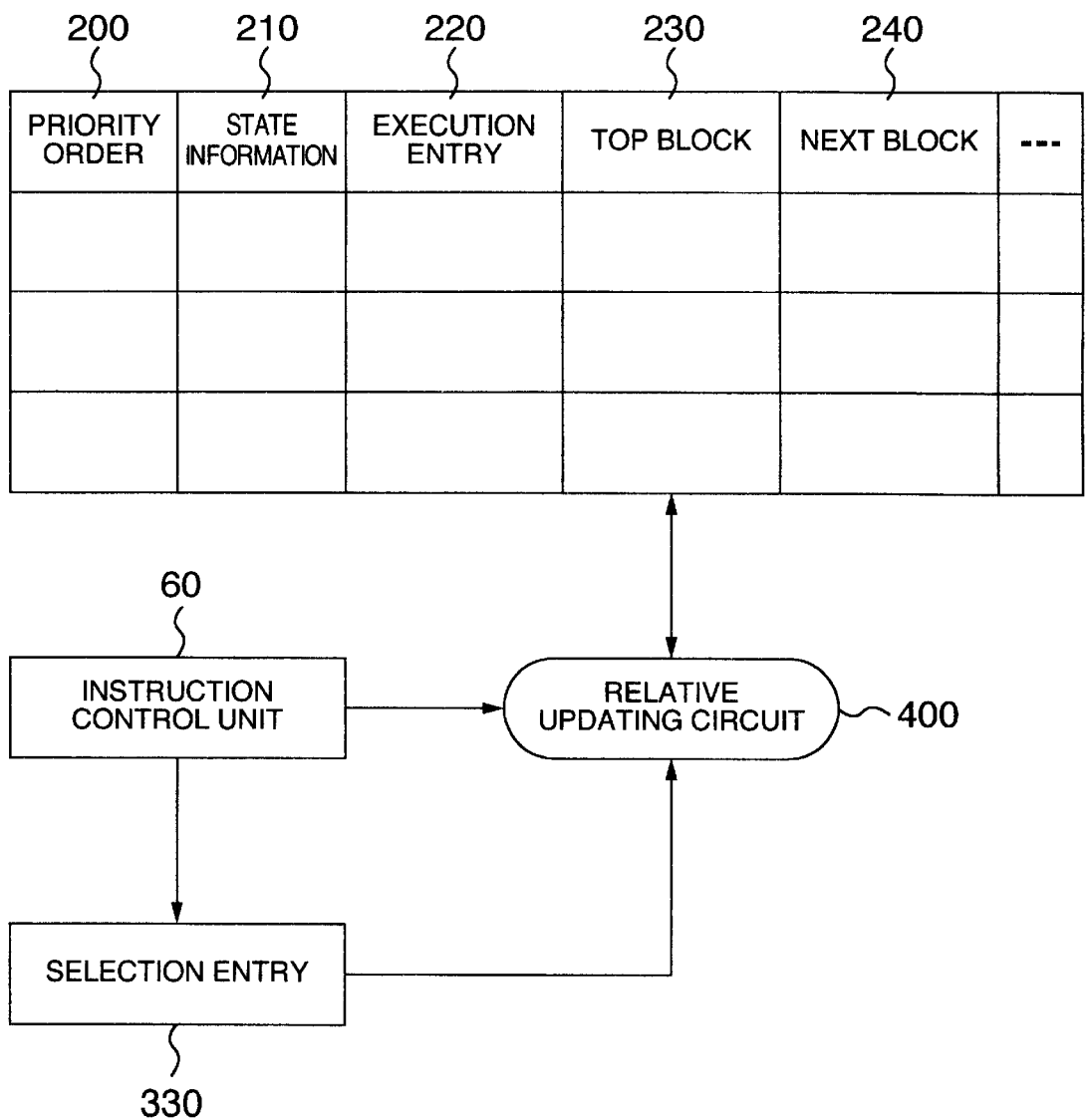
FIG. 10 is a structural diagram for explaining relative updating operation of a cache block.

Next, FIG. 10 illustratively indicates a structural example of a cache block relative updating operation in which when the cache memory block according to the embodiment of the present invention is cleared, relative information as to this cache memory block is updated.

The instruction control unit 60 is such a unit for decoding an instruction to produce a selection entry 330 which indicates an item where relative information among the cache blocks is stored, and also for instructing a cache memory block which should be cleared to a relative updating circuit 400. The relative updating circuit 400 corresponds to such a circuit for reading both the cache memory block which is instructed by the instruction control unit 60 and should be cleared, and the selection entry 330 so as to execute a relative updating operation.

Figure 11:
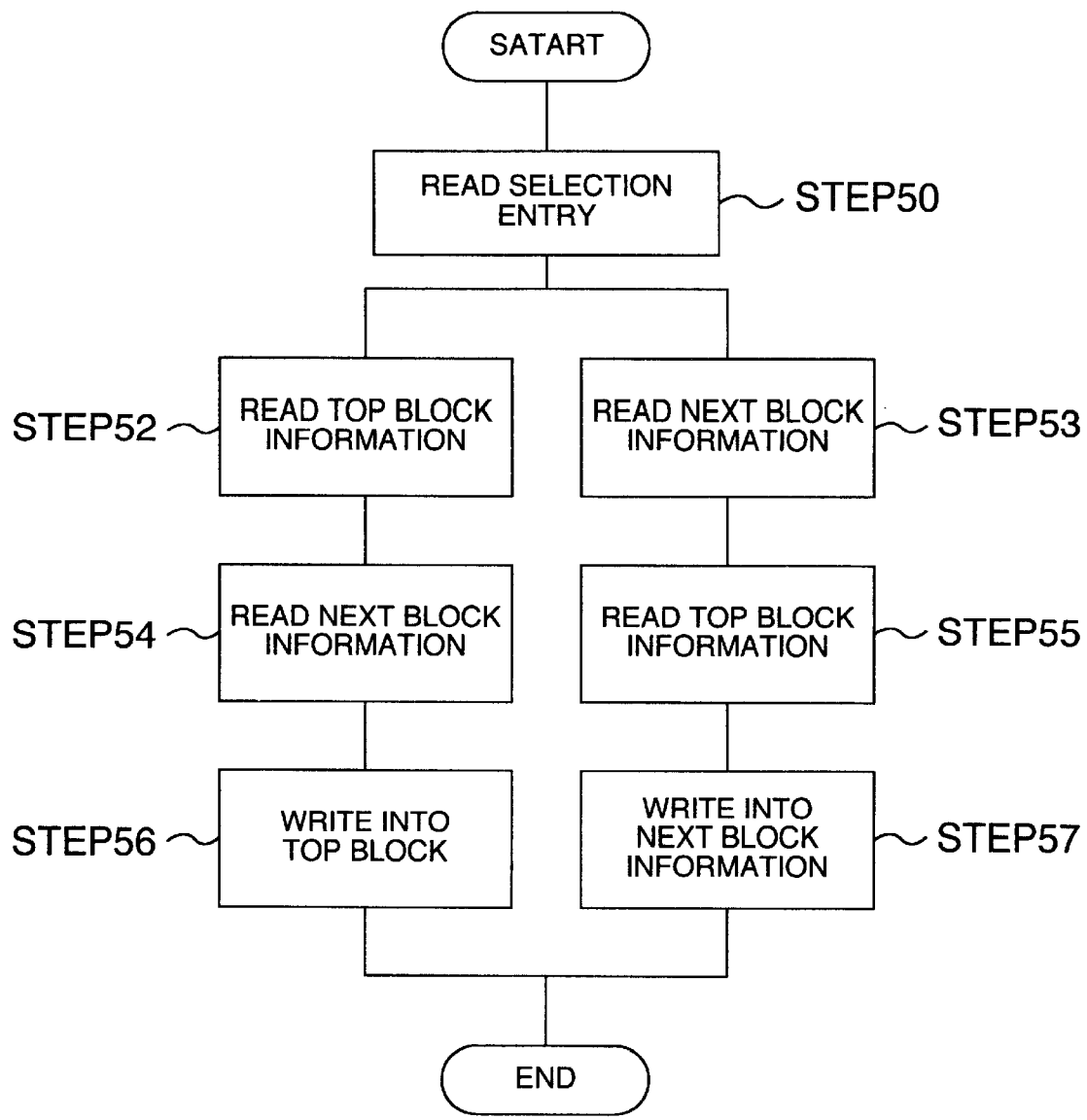
FIG. 11 is a flow chart for describing the relative updating operation of the cache block.

FIG. 11 is an explanatory diagram for explaining operations of the above-explained relative updating circuit 400. The relative updating circuit 400 reads both the cache memory block which is designated by the instruction control unit 60 and should be cleared, and also reads the selection entry 330 (step 50). Then, the relative updating circuit 400 reads information which is stored in the selection entry 330 in the cache memory block to be cleared, and such information which is stored in both the top block 230 and the next block 240 (steps 52 and 53).

The relative updating circuit 400 reads information of the next block 240 of the cache memory block which is stored in the top block 230 (step 54), and then writes the read information into the top block 230 of the cache memory block which is stored in the next block 240 (step 56).

The relative updating circuit 400 reads information of the top block 230 of the cache memory block, which is stored in the next block 240 (step 55), and then writes the read information into the next block 240 of the cache memory block, which is stored in the top block 230 (step 57).

Figure 12:
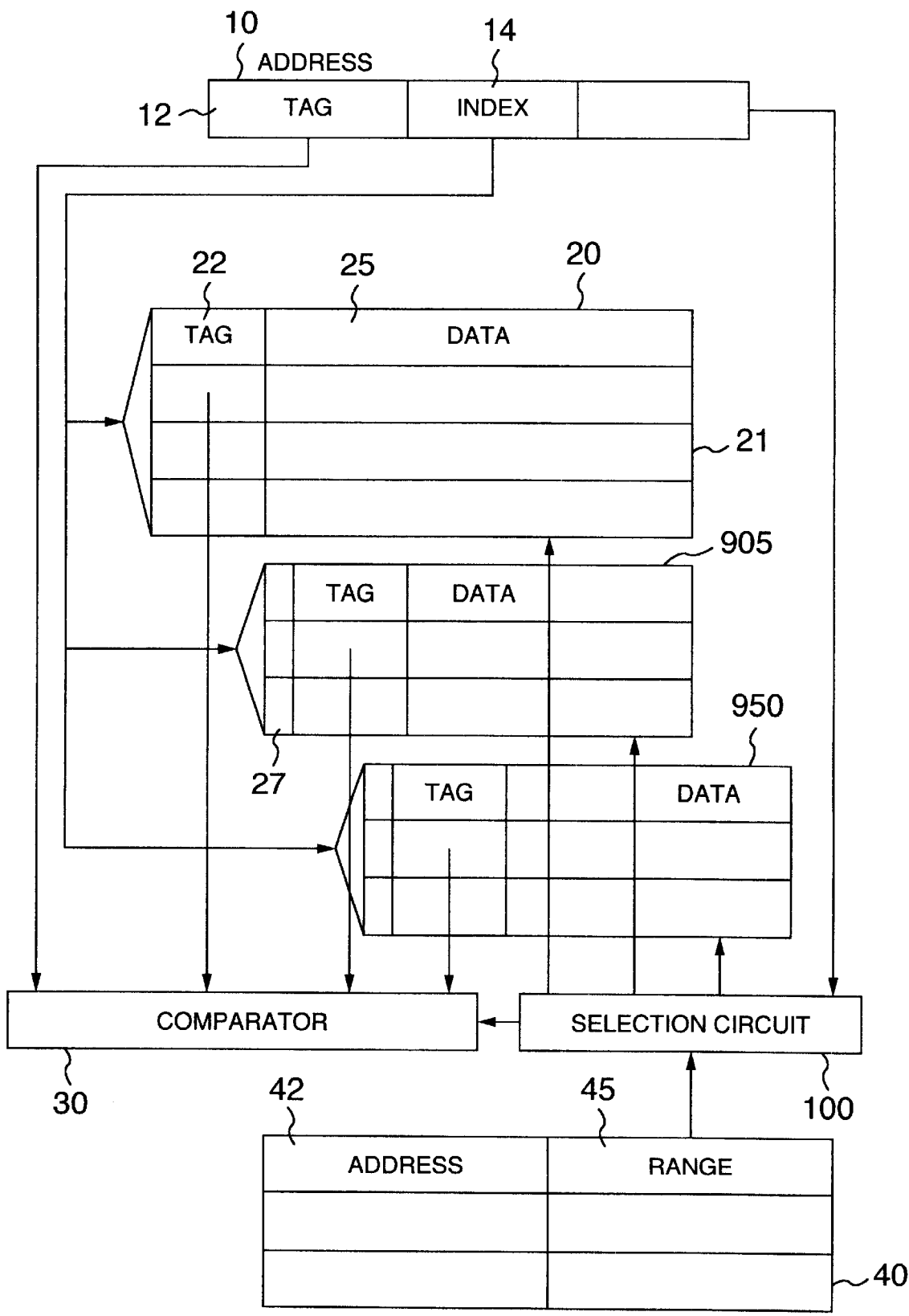
FIG. 12 is a diagram for schematically indicating a central processing unit, according to an embodiment, with employment of a cache instruction apparatus of the present invention.

FIG. 12 schematically shows an arrangement of a central processing apparatus, according to an embodiment, with employment of a cache instruction apparatus of the present invention.

The central processing apparatus, according to this embodiment, is comprised of an instruction cache 905, a data cache 950, and a cache memory apparatus 20 for storing thereinto system control information. Both the instruction cache 905 and the data cache 950 each own a valid bit 27 capable of indicating as to whether the memory content thereof is valid or invalid. It should be understood that both the instruction cache 905 and the data case 950 are equivalent to the conventional cache memory apparatus. As the cache memory apparatus owned by the conventional central processing apparatus, there are the Harvard architecture in which the cache memory apparatus is separated by the above-explained instruction and data, and the unified architecture in which the instruction is unified with the data for caching operations. The present invention does not depend upon the conventional cache system arrangement, but may be realized by employing any of the above-explained architecture. The previously explained reference numerals are applied to other structures, and therefore, detailed explanations thereof are omitted.

Figure 13:
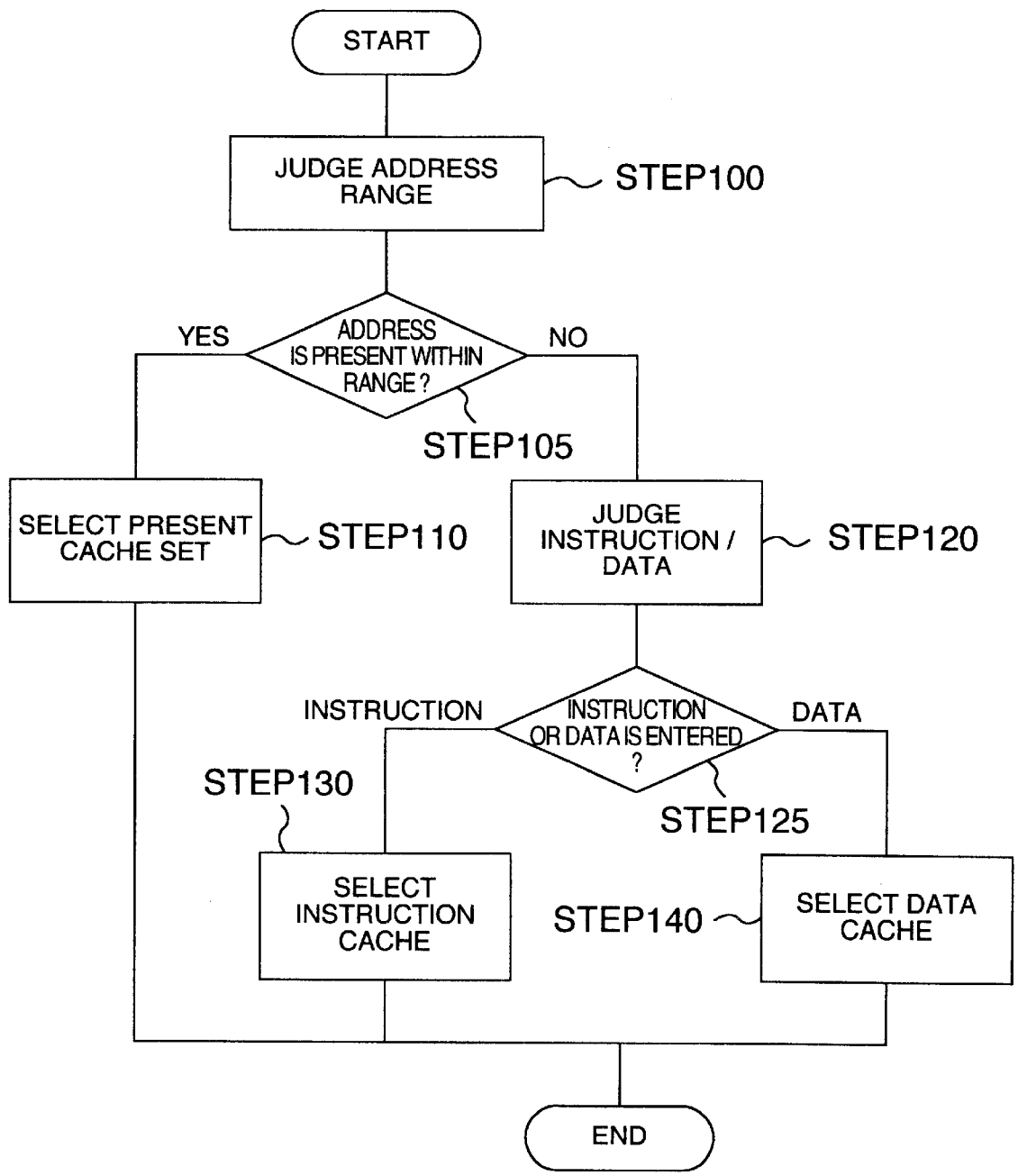
FIG. 13 is a flow chart for describing a cache selecting operation in a read mode.

Next, as operations of the central processing apparatus according to the embodiment of FIG. 12, a description will now be made of a sequential operation for reading the address 10 in correspondence with the cache memory 20 for storing the system control information, the instruction cache 905, and the data cache 950 with reference to FIG. 13.

The address 10 is subdivided into the tag bit group 12 of the upper grade portion of this address and the index bit group 14 of the lower grade portion thereof.

The address 10 is read in the selection circuit 100. The selection circuit 100 judges as to whether or not this address 10 is stored in the area defined by both the address 42 and the range 45, which are managed by the address management table 40 (step 100). In the case that this address 10 is stored within this area, the selection circuit 100 judges that the cache memory 20 for storing the system control information is selected (step 110). To the contrary, in the case that this address 10 is not stored in the area, the selection circuit 100 judges as to whether the address corresponds to the instruction or the data similar to the conventional central processing apparatus (step 120). Then, the selection circuit 100 instructs the comparator 30 to select either the instruction cache 905 (step 130) or the data cache 950 (step 140). As previously explained, in the case that a plurality of cache sets are owned, conventionally, the tags of all of the cache sets are compared with each other. As explained in connection with the present invention, since the address management table 40 and the selection circuit 100 are employed, the access speed is increased. Since the selection of the cache set can be done before drawing the tag, the execution time can be shortened.

Figure 14:
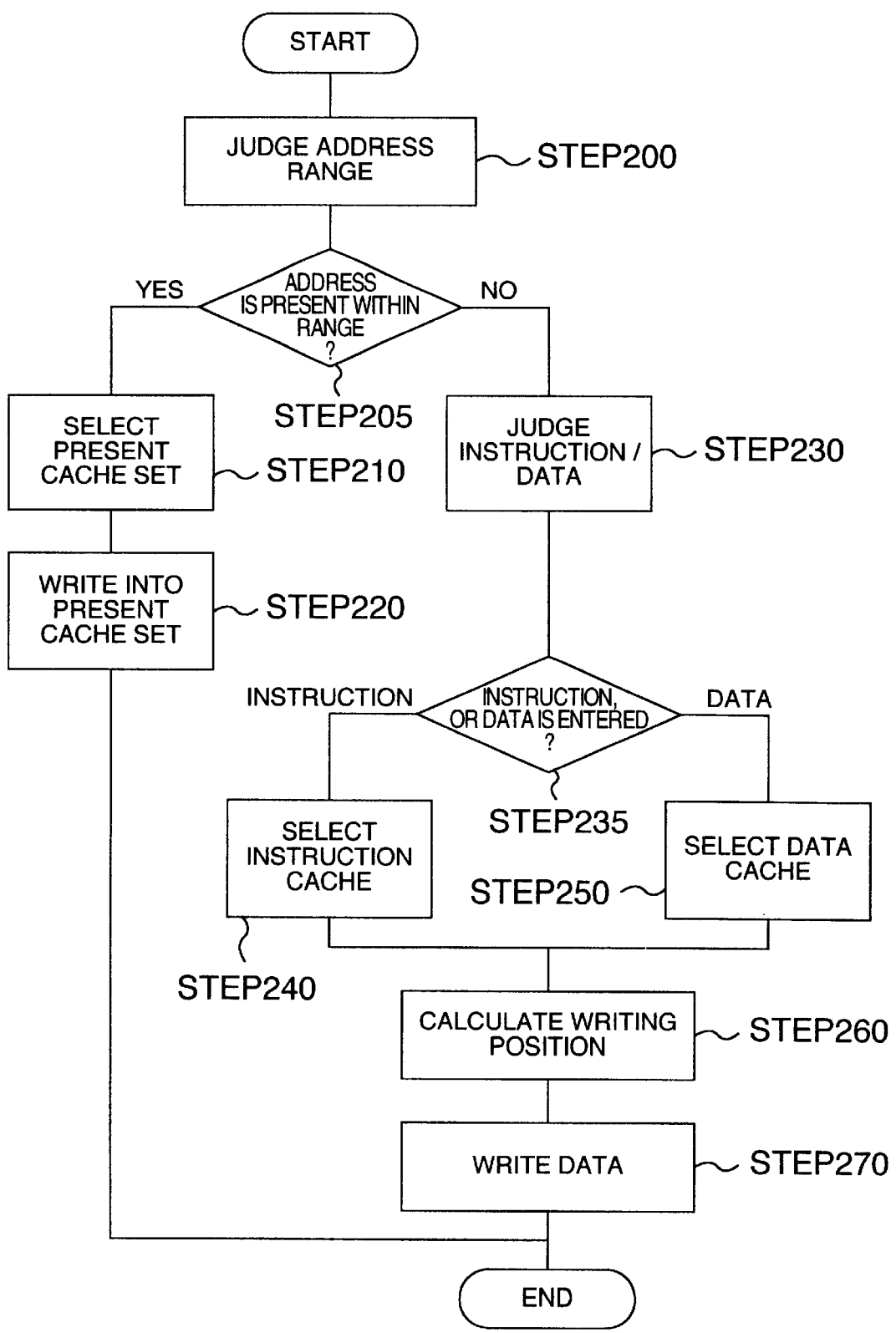
FIG. 14 is a flow chart for describing a cache selecting operation in a write mode.

Next, as operations of the central processing apparatus according to the embodiment of FIG. 12, a description will now be made of a sequential operation for writing the address 10 in correspondence with the cache memory 20 for storing the system control information, the instruction cache 905, and the data cache 950 with reference to FIG. 14.

The address 10 is read in the selection circuit 100. The selection circuit 100 judges as to whether or not this address 10 is stored in the area defined by both the address 42 and the range 45, which are managed by the address management table 40 (step 200). In the case that this address 10 is stored within this area, the selection circuit 100 selects the cache memory 20 for storing the system control information, (step 210). Then, the selection circuit 100 writes data into such a cache block 21 in which a tag 12 is made coincident with a tag 22 (step 220). To the contrary, in the case that this address 10 is not stored in the area, the selection circuit 100 judges as to whether the address corresponds to the instruction or the data similar to the conventional central processing apparatus (step 230). Then, the selection circuit 100 select either the instruction cache 905 (step 240) or the data cache 950 (step 250). Then, the selection circuit 100 calculates a writing position of the selected cache (step 260), and writes the data into this calculated writing position (step 270). It should be understood that as the known technique, the LRU (Least Recent Used) algorithm is known in the above-explained writing position calculation.

In accordance with the cache memory apparatus of this embodiment, with the constitution of providing the cache memory 20, the address 42 in which both the instruction group related to the system control information and the data group are stored, and the table 40 for managing the range 45, as a consequence, the below-mentioned effects can be achieved. That is, the access speed to the system control information can be increased in high speeds, and also the cache hit rate can be improved.

FIG. 15 represents an embodiment of an instruction set of the central processing apparatus shown in FIG. 12.

An address management table setting instruction 900 corresponds to such an instruction for setting the content of the address management table 40.

An area selection cache pre-load instruction 910 corresponds to such an instruction for executing a pre-load operation of the cache 20.

An area selection cache clear instruction 920 corresponds to such an instruction for designating an area of the address management table 40 to clear a cache.

A process execution instruction 930 by the system control information corresponds to an instruction for designating both an area of the address management table 40 and an offset entry so as to initiate a process operation.

A cache line clear instruction 940 corresponds to such an instruction for designating both a line and an entry of the cache 20 in order to clear the cache memory block 21 and also update the relative information of the cache memory block 21.

Figure 16:
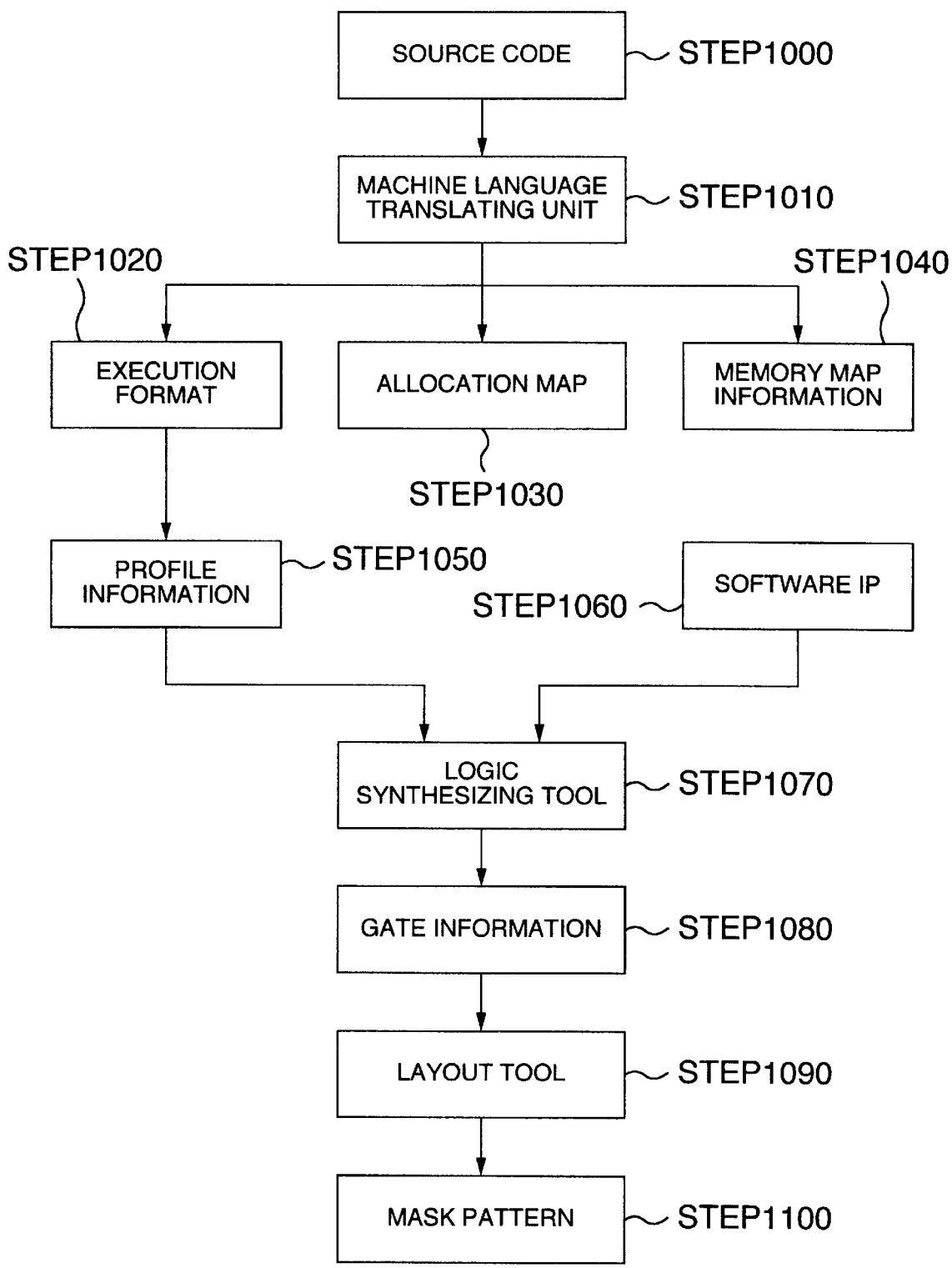
FIG. 16 is a flow diagram for representing an example of a method for developing a system-on chip in accordance with the present invention.

FIG. 16 explanatorily shows an embodiment of a system designing method with employment of the cache memory apparatus 1 according to the present invention.

An application source code 1000 is converted into an execution format by a machine language translating unit 1010. The application source code 1000 is described by using a program description language such as a function type language. This machine language translating unit 1010 produces a process unit allocation map 1030. This process unit allocation map 1030 indicates a correspondence map with respect to a process unit employed in the application source code 1000, namely a function in the source code described by the function type language according to this embodiment, and both an address and a range which are obtained by translating this process unit into a machine language. In such a system using a real-time operating system, this machine language translating unit 1010 also produces memory map information 1040 as the system control information. This memory map information 1040 indicates both a structure as to a task control block and information of a memory size.

When the execution format 1020 is executed under real-time operating system, such profile information 1050 is produced as to the process unit stored in the process unit allocation map 1030, namely, as to a calling frequency degree of the function in this embodiment.

Based upon the process unit allocation map 1030, the memory information 1040, and the profile information 1050, a capacity of the cache memory blocks 21, a total number of the cache memory blocks, and also a total entry number of the address management table 40 employed in the cache memory 20 for storing the system control information may be determined. The capacity/total number of the cache memory blocks 21, the total entry number of the address management table 40, and also software IP1060 of the cache memory apparatus 1 for storing the system control information are processed by a logic synthesizing tool 1070, so that gate information 1080 is produced. This gate information 1080 is processed by a layout tool 1090 so as to produce a mask pattern 1100. While this mask pattern 1100 is utilized, such a cache memory apparatus 1 capable of storing thereinto the system control information can be manufactured in the form of a semiconductor.

Figure 17A:
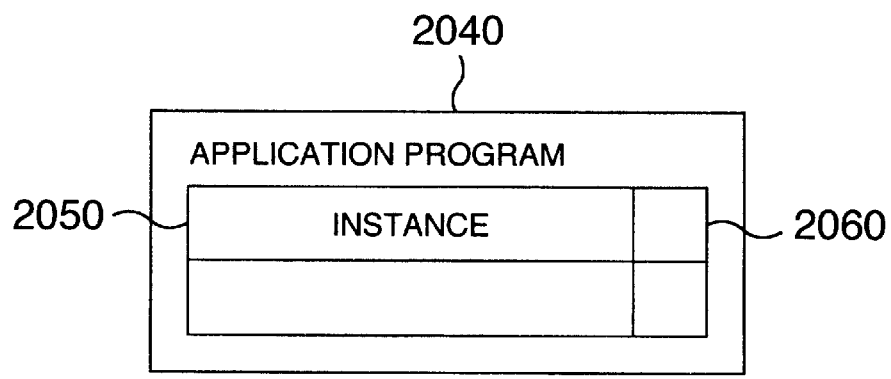
FIG. 17A and FIG. 17B are structural diagrams for illustratively indicating an arrangement of a hand-held terminal to which the present invention has been applied.
Figure 17B:
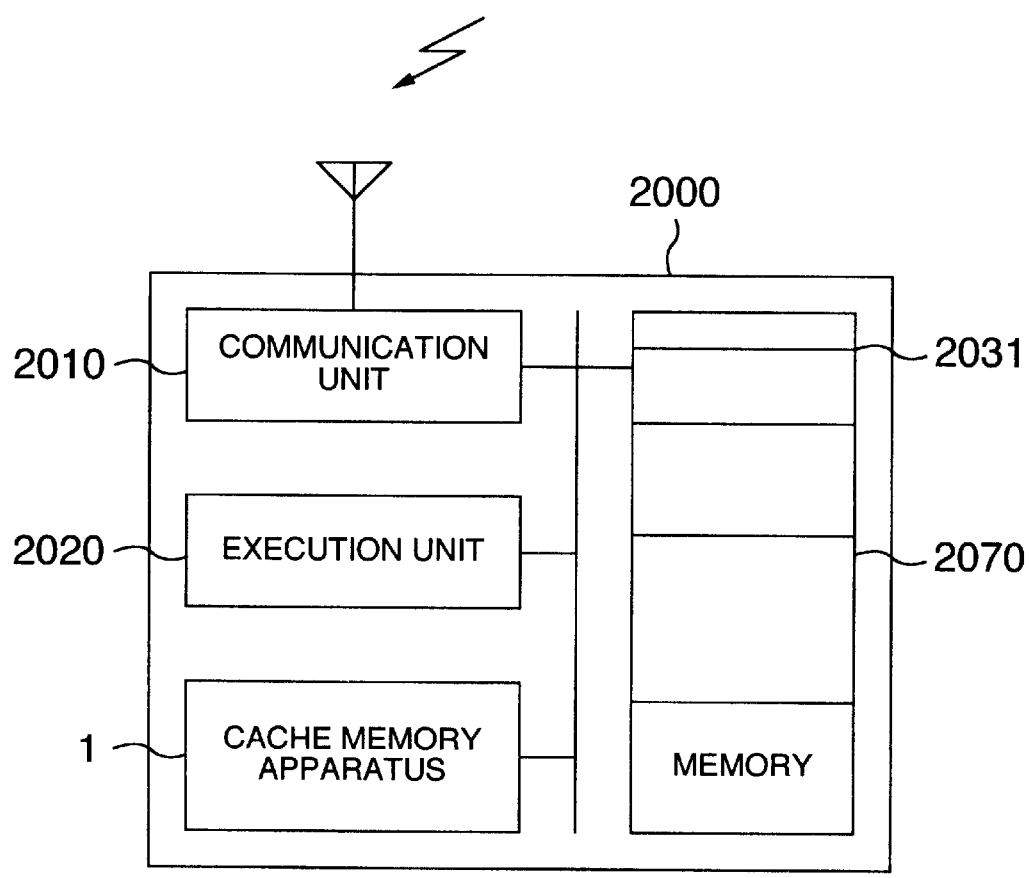

FIG. 17B schematically shows a hand-held terminal system having a communication unit, according to an embodiment, on which the cache memory apparatus 1 of the present invention, for storing system control information is mounted.

The hand-held terminal system 2000 is arranged by a communication unit 2010 for transmitting/receiving information such as an application program, an execution unit 2020 for executing this application program, a memory 2033 for storing thereinto this application program, the cache memory apparatus 1 for storing thereinto the system control information, and an input/output unit (not shown). It should also be noted that an application program 2040 indicated in FIG. 17A may be usually compressed in order to reduce a communication load. Also, the application program 2040 is constituted by an instance 2050 functioning as the unit of process operation. The instance 2050 contains priority order information 2060 capable of judging as to whether or not this instance 2050 should be stored in the cache memory apparatus 1. In accordance with this embodiment, the hand-held terminal system 2000 receives the application program by the communication unit 2010, and executes this received application program, so that the initiation performance of the application program of the system may be improved.

Figure 18:
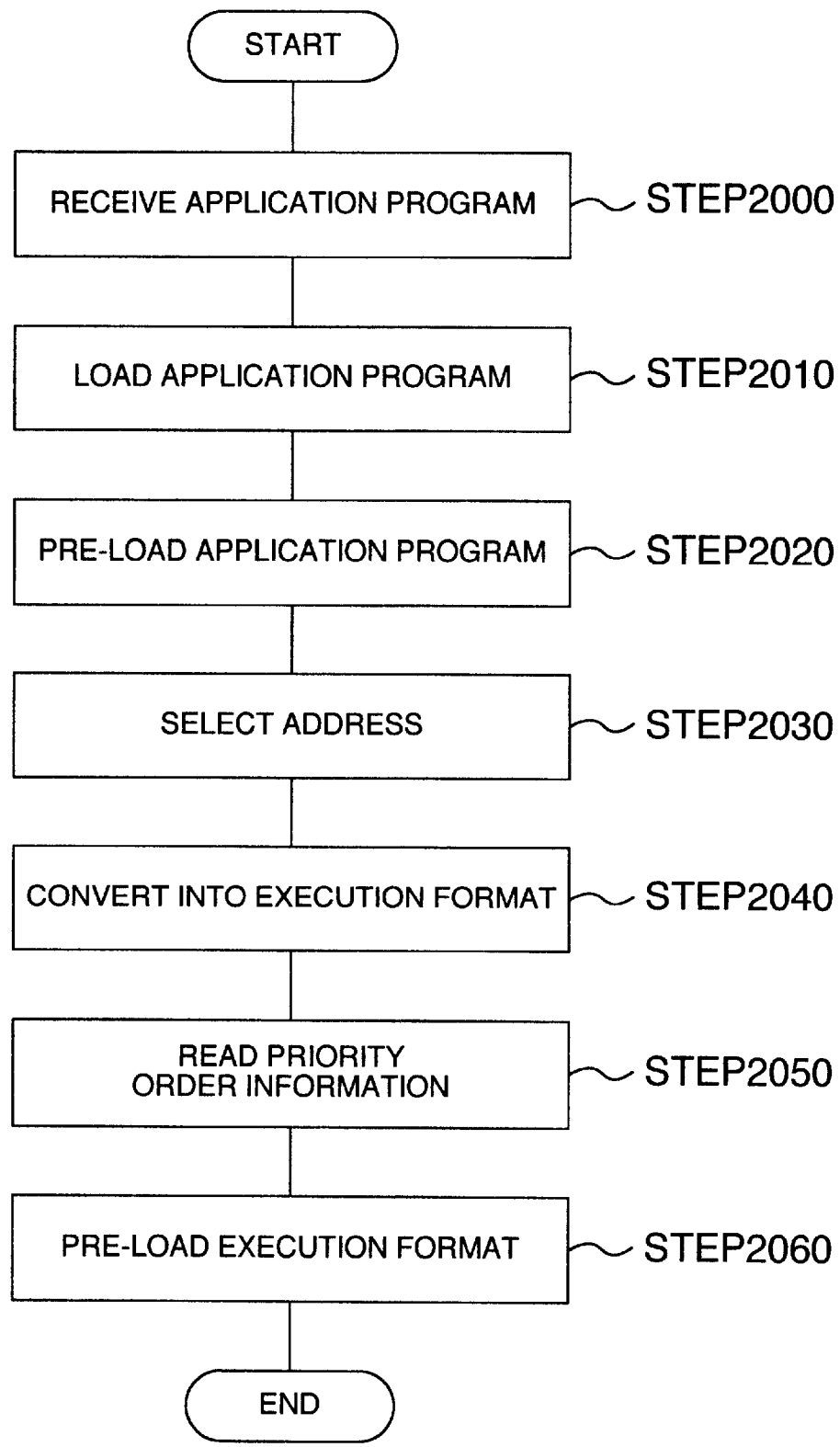
FIG. 18 is a flow chart for explaining operations of a cache memory employed in the hand-held terminal of FIG. 17A and FIG. 17B.

Referring now to a flow chart of FIG. 18, a process flow operation related to the cache memory shown in FIG. 17A and FIG. 17B will be explained. First, the communication unit 2010 receives the application program 2040 (step 2000), and then writes the received application program 2040 into the memory 2030 (step 2010). The communication unit 2010 notifies both an address and a range 2031 where this application program 2040 has been written to the cache memory application apparatus 1 by way of a cache pre-load instruction 910, and then pre-loads this notified application program 2040 to the cache memory apparatus 1 (step 2020). Next, the communication unit 2010 notifies this written address of the application program 2040 to the execution unit 2020 (step 2030). The execution unit 2020 which receives this notification refers to this address, and converts the application program 2040 into an execution format 2070 expanded to the instance 2050, and thereafter, writes the converted execution format 2070 into the memory 2030 (step 2040). The execution unit 2020 reads the priority order information 2060 of this instance 2050 (step 2050), and then, notifies both an address and a range of the instance 2050 to which the priority order has been set to the cache memory apparatus 1 by using a cache pre-load instruction 910 (step 2060).

Since such a system is carried out, in the system having the communication unit by which the application program is received so as to be executed, the initiation performance when the application program is received can be improved. Also, since the communication unit is provided, the content of the address management table 40 can be transmitted/received to another station. As a result, since the content of this address management table 40 is transmitted to another station, the condition of this system can be reported. While the content of such an address management table 40 is received by another station, the content of the cache memory may be changed by employing the cache preload instruction, so that the system performance can be adjusted outside the own station.

It should also be noted that as this communication unit, a wired communication using the Internet may be employed.

Also, since an arithmetic processing system is arranged by employing the cache memory apparatus of the present invention, an arithmetic processor, and a peripheral appliance, an access operation may be performed in a high speed and also a cache hit rate may be increased.

What is claimed is:

1. A central processing apparatus comprising:

a cache memory for storing thereinto at least one of information about an instruction group related to a system control and information about a data group;

an address management table for managing both an address and a range with respect to said cache memory into which said information is stored;

a selection circuit for selecting said cache memory in response to an access to said address management table, wherein system control information is stored into said cache memory, and said system control information is used to manage a task, a process, and a thread, which constitute an operation unit of the system, an offset management table for managing an offset value of the information with respect to each item, which constitute the system control information stored in said cache memory; and means for designating an entry of said offset management table so as to interpret information which is located at an offset value of said entry, and for outputting an execution address, said execution address being set to a program counter.

2. A central processing apparatus comprising:

a cache memory for storing thereinto at least one of information about an instruction group related to a system control and information about a data group;

an address management table for managing both an address and a range with respect to said cache memory into which said information is stored;

a selection circuit for selecting said cache memory in response to an access to said address management table, wherein system control information is stored into said cache memory, and said system control information is used to manage a task, a process, and a thread, which constitute an operation unit of the system, an offset management table for managing an offset value of the information with respect to each item, which constitute the system control information stored in said cache memory; and a comparing unit for designating both an entry to be compared and an entry to be selected from said offset management table in order that as to data indicative of offset values of the entry to be compared, the values of said entries of all of cache memory blocks are compared, wherein data indicated by the offset value of the entry to be selected is inputted/outputted.

3. A central processing apparatus comprising:

a cache memory for storing thereinto at least one of information about an instruction group related to a system control and information about a data group;

an address management table for managing both an address and a range with respect to said cache memory into which said information is stored;

a selection circuit for selecting said cache memory in response to an access to said address management table, wherein system control information is stored into said cache memory, and said system control information is used to manage a task, a process, and a thread, which constitute an operation unit of the system, an offset management table for managing an offset value of the information with respect to each item, which constitute the system control information stored in said cache memory;

a table for managing addresses of both the instruction group and the data group, which are related to the system control information, with respect to said cache memory; and a selection apparatus for selecting said cache memory apparatus from another cache memory apparatus by comparing said addresses with each other.

* * * * *